(12) United States Patent
Nakayama (10) Patent No.: US 7,808,545 B2
(45) Date of Patent: Oct. 5, 2010

(54) IMAGE-PICKUP DEVICE, COLOR CHART, IMAGE ADJUSTING METHOD, AND IMAGE ADJUSTING SYSTEM

(75) Inventor: Satoshi Nakayama, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 11/035,241

(22) Filed: Jan. 13, 2005

(65) Prior Publication Data

US 2005/0162542 A1 Jul. 28, 2005

(30) Foreign Application Priority Data

Jan. 23, 2004 (JP) .............................. 2004-015782

(51) Int. Cl.
- G03B 7/00 (2006.01)
- H04N 5/235 (2006.01)
- H04N 9/73 (2006.01)
- H04N 17/02 (2006.01)

(52) U.S. Cl. ................. 348/362; 348/221.1; 348/223.1; 348/187

(58) Field of Classification Search ......... 348/187–188, 348/369, 362, 221.1, 231.1
See application file for complete search history.

(56) References Cited

U.S. PATENT DOCUMENTS

| | | | | |
|---|---|---|---|---|
| 4,575,124 A | * | 3/1986 | Morrison | ............... 283/115 |
| 5,602,615 A | * | 2/1997 | Muramatsu et al. | ......... 396/228 |
| 6,256,062 B1 | * | 7/2001 | Endo | ........................ 348/223.1 |
| 6,618,079 B1 | * | 9/2003 | Higuchi | .................... 348/223.1 |
| 6,633,330 B1 | * | 10/2003 | Sugiura et al. | .............. 348/188 |
| 6,961,086 B1 | * | 11/2005 | Ichikawa | .................. 348/223.1 |
| 2002/0057847 A1 | * | 5/2002 | Hayashi et al. | ............. 382/282 |
| 2005/0162542 A1 | * | 7/2005 | Nakayama | ................... 348/362 |

FOREIGN PATENT DOCUMENTS

| | | |
|---|---|---|
| JP | 11-113007 A | 4/1999 |
| JP | 2004-023209 A | 1/2004 |

* cited by examiner

Primary Examiner—Jason Chan
Assistant Examiner—Tuan H Le
(74) Attorney, Agent, or Firm—Canon U.S.A., Inc. I.P. Division (57) ABSTRACT

When switching a mode between an imaging mode imaging an object and an adjustment mode adjusting an image produced by the imaging, in accordance with the switched mode, one photometric region is selected from at least two photometric regions to an image signal obtained from incident light, and exposure of the incident light is controlled on the selected photometric region based on photometric information, thereby achieving accuracy in adjusting the image produced by imaging an object by preventing effect on exposure due to dispersion in field angle.

12 Claims, 11 Drawing Sheets

IMAGE-PICKUP DEVICE, COLOR CHART, IMAGE ADJUSTING METHOD, AND IMAGE ADJUSTING SYSTEM

CROSS REFERENCE TO RELATED APPLICATION

This application claims priority from Japanese Patent Application No. 2004-015782 filed Jan. 23, 2004, which is hereby incorporated by reference herein.

BACKGROUND OF THE INVENTION

1. Field of the Invention

The present invention relates to an image pickup system for imaging an object to form images, an image adjustment system, a color chart for chroma control of the image pickup system, and an image adjustment method for adjusting the images.

2. Description of the Related Art

Hitherto, in imaging devices such as electronic cameras, in order to correct characteristics such as the spectral transmission of an imaging optical system or the spectral characteristics of a color filter of an imaging element, initial adjustment of characteristics for white balance and color balance is employed, for example, at the factory shipment or at a maintenance division. For example, by using a light box or a color-bar chart as a reference light source, the reference value for white balance and a linear matrix may be adjusted.

A conventional image pickup system is described below with reference to the drawings.

Figure 10:
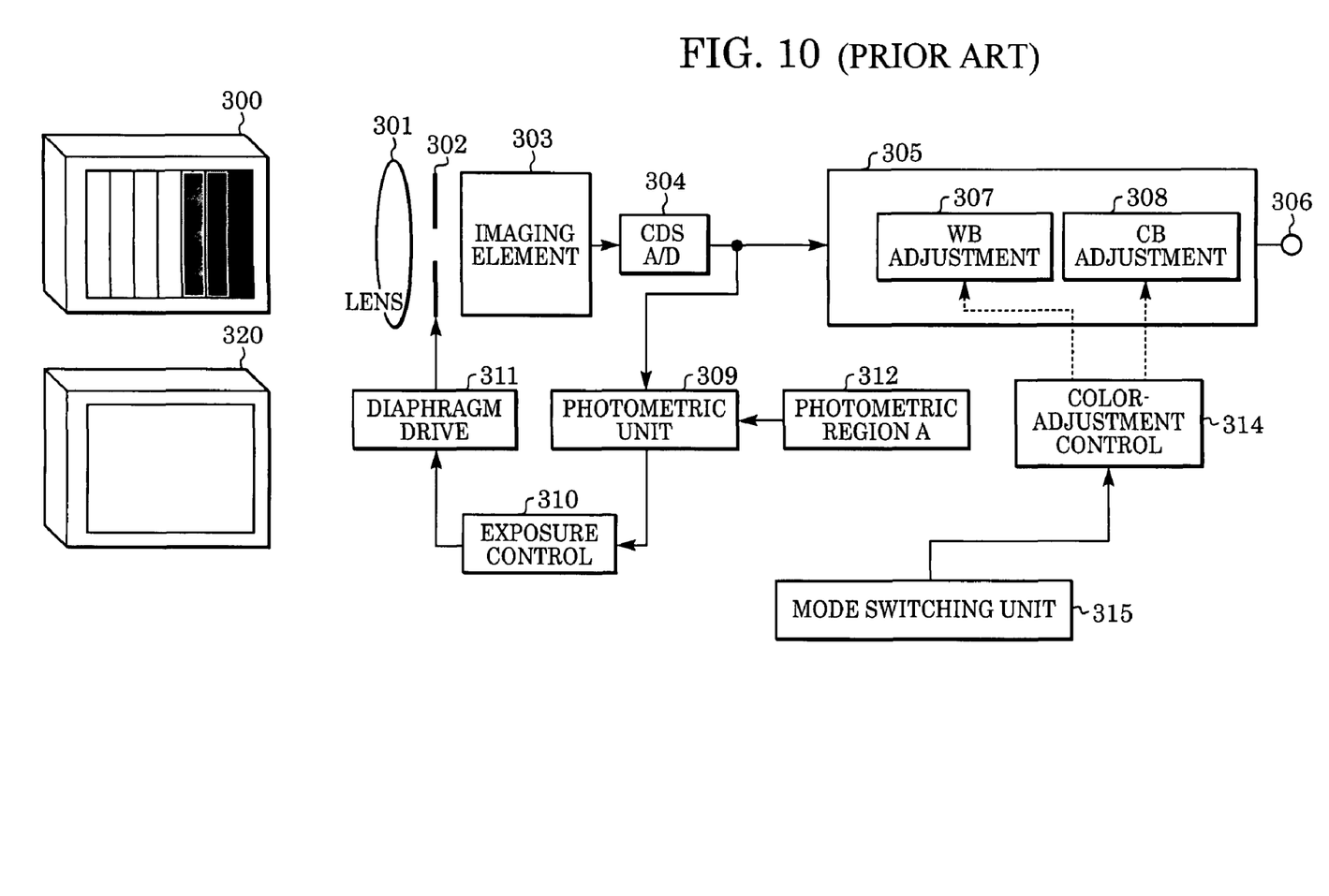
FIG. 10 is a block diagram of an image-pickup system of a conventional electronic camera.

FIG. 10 is a block diagram of an imaging system of a conventional electronic camera. In FIG. 10, there are shown a light box/color-bar chart 300 used for adjusting color balance, a lens 301, a diaphragm 302 for adjusting light exposure, an imaging element 303, an analog front end 304 for A/D conversion by sampling the output of the imaging element 303, a signal processor 305, an image output unit 306, a white-balance adjustment unit 307 included in the signal processor 305, a color-balance adjustment unit 308 included in the signal processor 305, a photometric unit 309, an exposure control unit 310, a diaphragm drive unit 311, a photometric region A 312 for providing a region where the photometric measurement is performed with the photometric unit 309, a color-adjustment control unit 314, a mode switching unit 315 for switching the mode between an imaging mode and an adjustment mode, and a white chart 320 for use in white balance adjustment.

In an imaging mode, a light ray incident on the lens 301 is photo-electrically converted by the imaging element 303 after receiving appropriate exposure adjustment with the diaphragm 302. The image signal is then sampled and A/D converted in the analog front end 304 so as to produce an output from the image output unit 306 after being processed by the signal processor 305. At this time, in the photometric unit 309, the A/D converted image signal is sampled over a region defined by the photometric region A (312) so as to control an exposure amount in the exposure control unit 310 based on the photometric result while the state of the diaphragm 302 is controlled by the diaphragm drive unit 311. In general, for photometry over the photometric region A (312), center-weighted average photometry is used, so as to have the photometry centering a central object as well as taking the vicinity into consideration. In the imaging mode, the white balance adjustment unit 307 and the color balance adjustment unit 308 have been pre-adjusted and process a color signal based on the pre-adjustment so that an optimal color signal is produced.

Figure 11:
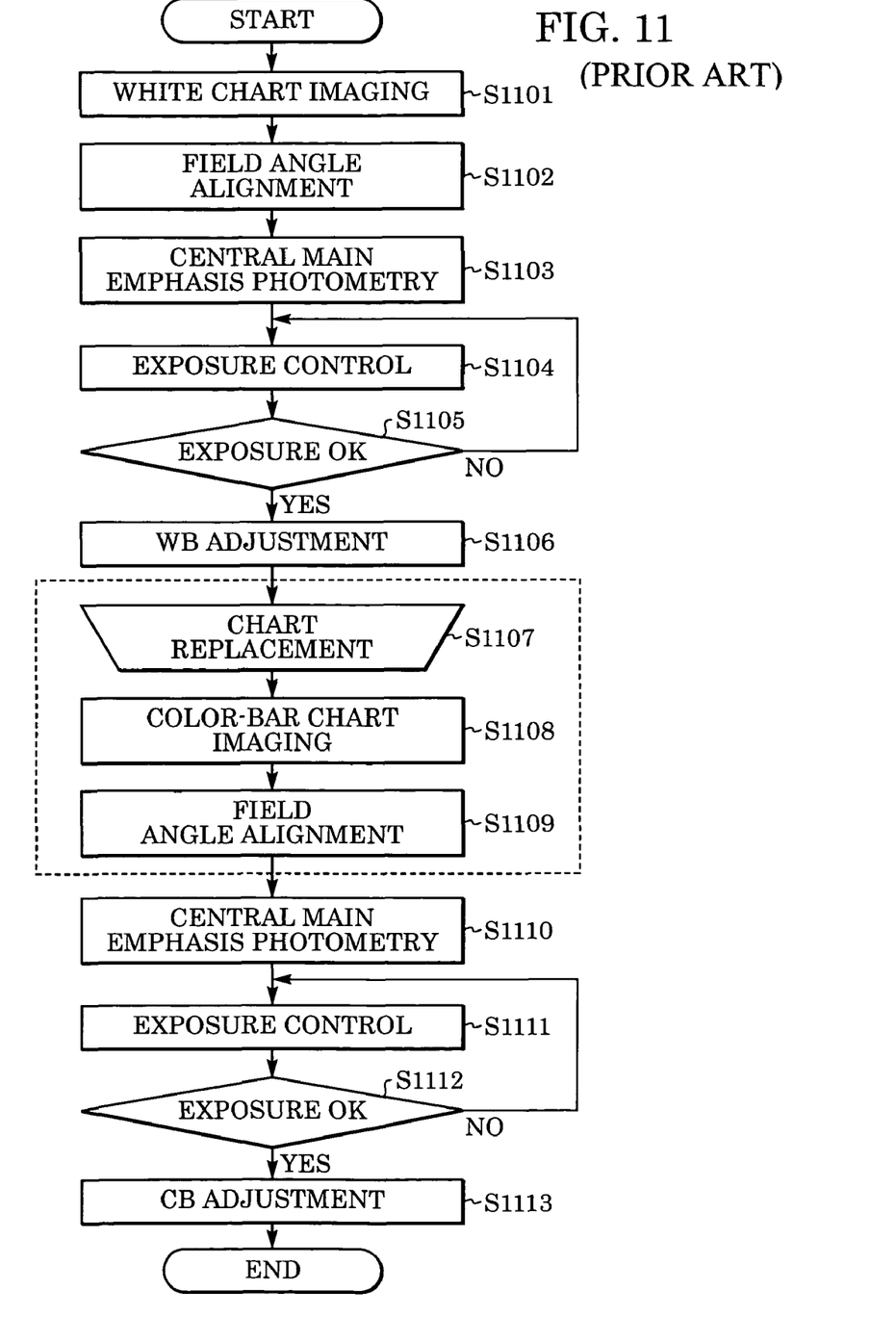
FIG. 11 is a flowchart of color adjustment process in a conventional image-pickup system.
Figure 12:
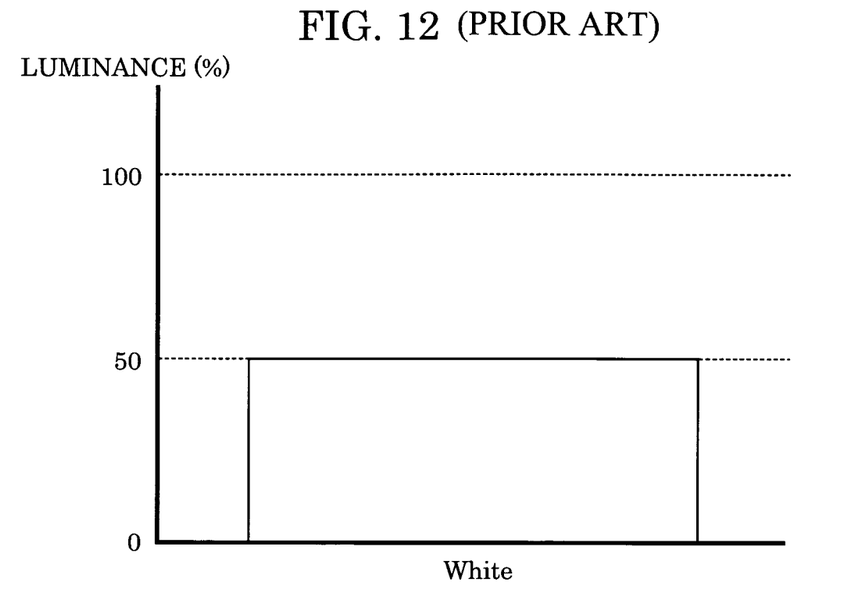
FIG. 12 is a characteristic drawing showing luminance levels when a white chart is imaged in the conventional image-pickup system.
Figure 13:
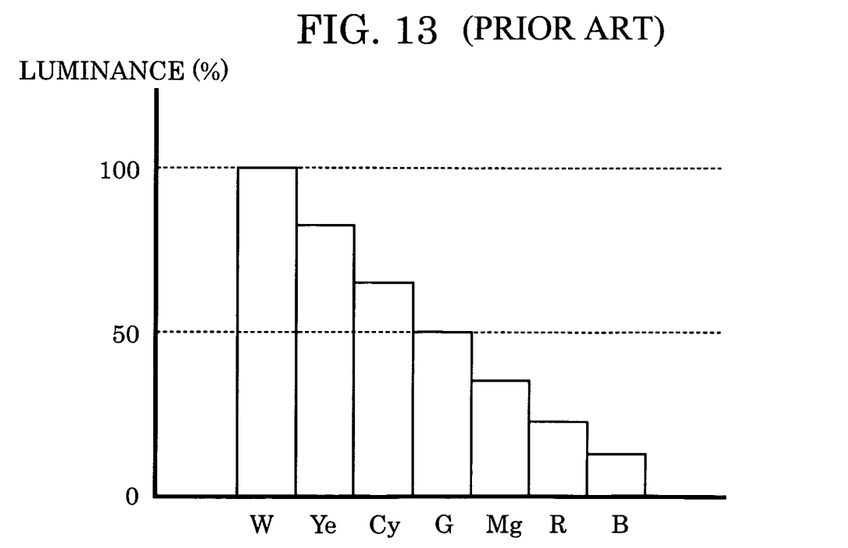
FIG. 13 is a characteristic drawing showing luminance levels when a seven-color color-bar chart is imaged in the conventional image-pickup system.

FIG. 11 is a flowchart showing a color adjustment process of a conventional imaging system. FIG. 12 is a characteristic diagram showing luminance levels when a white chart is imaged. FIG. 13 is a characteristic diagram showing luminance levels when a 7-color color-bar chart is imaged in the conventional imaging system. Signal processing in the imaging system of FIG. 10 will be described below with reference to the flowchart of FIG. 11.

To employ color adjustment, white balance adjustment is initially performed.

Specifically, the image of the white chart 320 (FIG. 10) is captured (Step S1101). Subsequently, a field angle is aligned (Step S1102). Then, the light ray from the white chart 320 and through the lens 301 is photo-electrically converted by the imaging element 303 after receiving appropriate exposure adjustment with the diaphragm 302, and is sampled and A/D converted in the analog front end 304. In the photometric unit 309, the A/D converted image signal is sampled over the region defined by the photometric region A so as to perform center-weighted average photometry (Step S1103). Subsequently, on the basis of the photometric result, the amount of exposure is controlled in the exposure control unit 310 (Step S1104), and the state of the diaphragm 302 is controlled by the diaphragm drive unit 311 (Step S1105). The luminance level herein of the exposure-controlled image signal becomes 50% as shown in FIG. 12, so that the image signal of the white chart controlled at 50% is entered to the signal processor 305.

In Step 1106, white balance adjustment is carried out in a color adjustment mode (selected using the mode switching unit 315). White balance adjustment is implemented by using the color-adjustment control unit 314 to control the white-balance adjustment unit 307. The white balance adjustment for white balance control herein means the production of information, such as the control range of the white balance control, by sampling a reference image of a color temperature (white balance control attempts to control according to variation in environmental and lighting conditions when an object is imaged, by selecting color temperature range, which is pre-adjusted at white balance initial adjustment of the factory shipment or a maintenance division, corresponding to various lighting conditions). Here, the adjusted control range to be used for the white balance control is obtained by sampling reference images of color temperatures.

Next, the color balance is adjusted.

Specifically, the chart to be imaged is replaced with the 7-color color-bar chart 300 (FIG. 10) at first (Step S1107). Subsequently, the 7-color color-bar chart 300 is imaged (Step S1108), and a field angle is aligned (Step S1109). Then, the light ray incident on the lens 301 by imaging the 7-color color-bar chart 300 is photo-electrically converted by the imaging element 303 after receiving appropriate exposure adjustment with the diaphragm 302, and is sampled and A/D converted in the analog front end 304. In the photometric unit 309, the A/D converted image signal is sampled over the region defined by the photometric region A so as to perform the center-weighted average photometry (Step S1110). Subsequently, on the basis of the photometric result, the amount of exposure is controlled in the exposure control unit 310 (Step S1111), and the state of the diaphragm 302 is controlled by the diaphragm drive unit 311 (Step S1112). The luminance level herein of the exposure-controlled image signal becomes 50% in entire average as shown in FIG. 13, so that the image signal of the 7-color color-bar chart controlled at 50% is entered to the signal processor 305.

Note that the field angle during imaging of the chart should be strictly aligned. The reason is that because of the center-weighted average photometry, if the peripheral region of the chart is reflected, or the sides of the chart are cut off, the average luminance level is changed, so that an appropriate amount of exposure cannot be obtained. This is the same in the case of a white chart, so that if the field angle alignment is not appropriate, the signal level is changed and the precise adjustment cannot be obtained.

When the color adjustment mode is selected by the mode switching unit 315, the color balance is adjusted by the color-adjustment control unit 314 in the color-balance adjustment unit 308 (Step S1113). The color balance herein means the adjustment of color tone and chroma of each color. Color balance adjustment can be specific to certain colors, for example, yellow and red as will be described below.

Color balance is generally adjusted with respect to color-difference signals Cr and Cb by changing gain and color tone. This is principally equivalent to that even when adjusting by multiplying the RGB by a matrix factor. Hence, when the matrix is linear, three or more kinds of color tones cannot be independently adjusted. In this regard, proper reproduction of the color of the human flesh (also a memory color) is desirable. Since yellow and red do impact the color of the human flesh, it is desirable to adjust both colors to obtain desired target values. Accordingly, the color balance adjustment for yellow and red is implemented by sampling yellow and red portions of a 7-color color-bar chart so as to determine a matrix factor so that the colors have desired target values.

However, in the conventional imaging system, when images produced by imaging an object are adjusted in color, the white chart for adjusting the white balance and the color-bar chart for adjusting the color balance has to be replaced, thus, unnecessarily increasing the adjustment time for adjusting white balance and color balance. Moreover, since in the photometric region for color adjustment, the center-weighted average photometry is used in the same way as in the photometric region for the imaging, minute dispersion in field angle affects exposure, which can cause inaccurate color adjustment.

SUMMARY OF THE INVENTION

In an imaging system, a color chart and an image adjusting method of the present invention have been made in view of the problems described above. Among other advantages, the imaging system of present invention is capable of accurate white balance and color balance adjustment by preventing effects on image exposure due to dispersion in field angle, when images produced by imaging an object are adjusted. Another advantage is that the present invention is capable of reducing the amount of time required for carrying out white balance and color balance adjustment.

In accordance with a first aspect of the present invention, there is provided an image-pickup system including a mode switching unit which switches a mode at least between an imaging mode capturing an image of an object and an adjustment mode adjusting the image produced by capturing the image; a photometric unit which makes photometric measurement in an image signal obtained from incident light on a first and a second photometric region; a photometric-region selecting unit which selects either the first or the second photometric region for photometry with the photometric unit in accordance with the mode switched by the mode switching unit; and an exposure control unit which controls exposure of the incident light based on photometric information from the photometric unit.

In accordance with a second aspect of the present invention, there is provided an image-pickup system for producing images by imaging an object, which includes a color adjustment unit which adjusts colors of the images using a color chart composed of at least three colors including an achromatic color and a chromatic color, wherein the color adjustment unit adjusts white balance of the images by color-measuring an achromatic color portion of the color chart while adjusts color balance of the images by color-measuring a chromatic color portion of the color chart.

In accordance with a third aspect of the present invention, there is provided a color chart for use in adjusting a color of an image-pickup system, which includes an achromatic color and two or more chromatic colors, wherein the two chromatic colors are laterally arranged about the achromatic color as the center.

In accordance with a fourth aspect of the present invention, there is provided an image adjusting method including switching a mode at least between an imaging mode capturing an image of an object and an adjusting mode adjusting the image produced by capturing the image; making photometric measurement on an image signal obtained from incident light in either the first or the second photometric region in accordance with the switched mode by the switching; and controlling exposure of the incident light based on photometric information from the process of making photometric measurement.

In accordance with a fifth aspect of the present invention, there is provided an image adjusting method for adjusting an image produced by imaging an object, which includes color adjusting the image using a color chart composed of at least three colors including an achromatic color and a chromatic color, wherein in the color adjusting process, white balance is adjusted for the image by measuring an achromatic color portion of the color chart while color balance is adjusted for the image by measuring a chromatic color portion of the color chart.

In accordance with a sixth aspect of the present invention, there is provided an image adjusting system including an imaging unit which images an object; a color chart composed of at least three colors including an achromatic color and a chromatic color; a mode switching unit which switches a mode at least between an imaging mode imaging an object and an adjusting mode adjusting the image produced by the imaging; a photometric measuring unit which makes photometric measurement on an image signal from the imaging unit on a first and a second photometric region; a photometric-region selecting unit which selects either the first or the second photometric region for photometry made by the photometric measuring unit in accordance with the mode switched by the mode switching unit; and an exposure control unit which controls exposure of incident light based on photometric information from the photometric measuring unit.

As described above, since the photometric region for photometry made by the photometric measuring unit is selected in accordance with the mode switched between the imaging mode and the adjusting mode, the effect on image exposure due to dispersion in field angle can be prevented by making partially photometric measurement on the photometric region in the adjustment mode, thereby improving accuracy in adjusting the image produced by imaging an object.

Since color is adjusted using a color chart composed of at least three colors including an achromatic color and a chromatic color according to the fifth aspect, a period of time for the white balance adjustment and the color balance adjustment can be reduced. Cost is also reduced, by simplifying the white balance and color balance adjustment system. Since the white balance is adjusted by measuring an achromatic color, such as a white (other than black) portion of the color chart while the color balance is adjusted by measuring chromatic colors (chromatic portions other than white) of the color chart, the effect due to dispersion in field angle can be eliminated, improving accuracy in adjusting the color. Also, since the white balance is adjusted by measuring a white portion of the color chart and a color-temperature conversion portion of the color chart while the color balance is adjusted by measuring chromatic color portions of the color chart, the white balance can be adjusted without using a color-temperature conversion filter.

Further features and advantages of the present invention will become apparent from the following specification with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will be described in detail in accordance with the accompanying drawings.

First Embodiment

Figure 1:
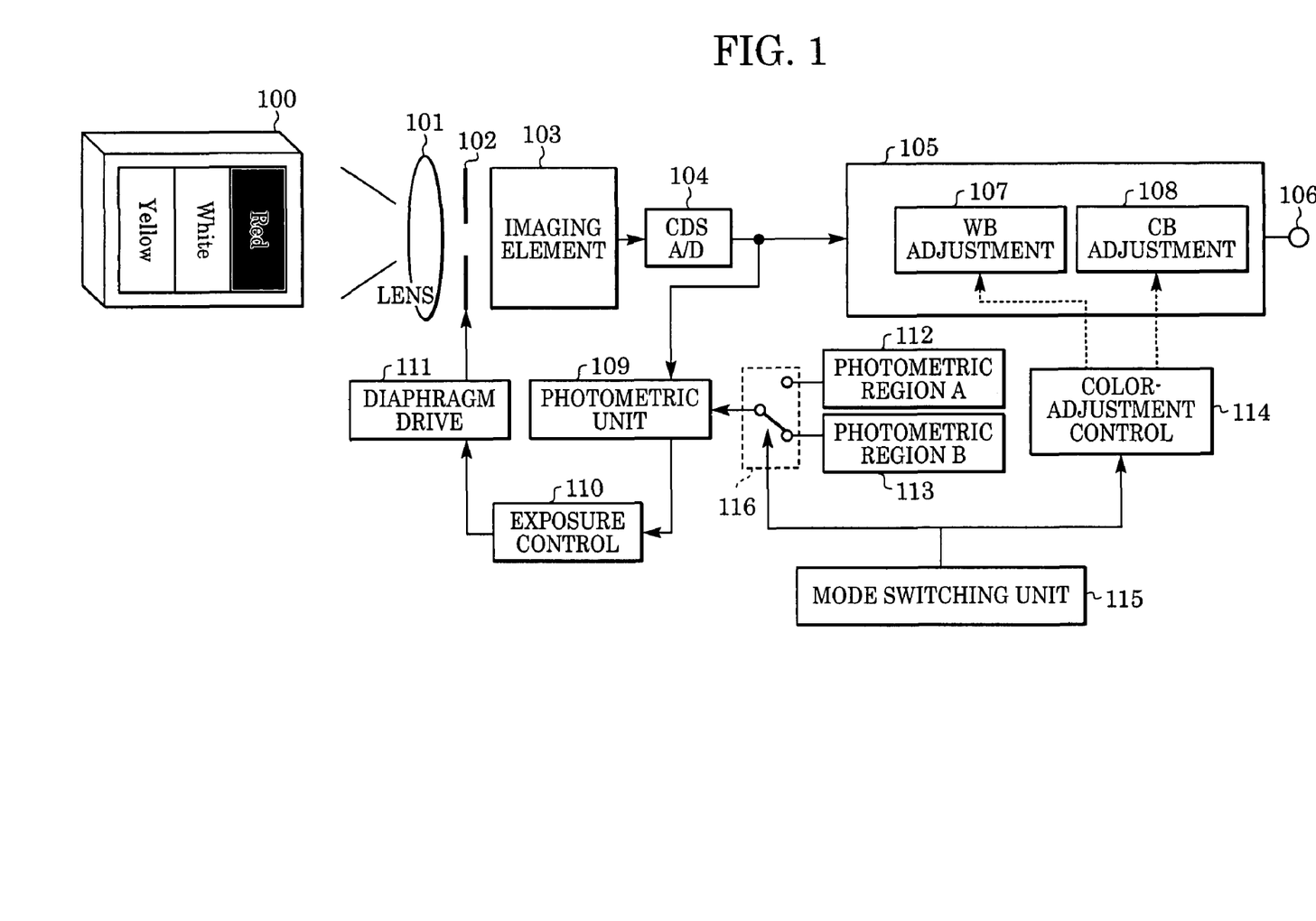
FIG. 1 is a block diagram of an image-pickup system and an image adjusting system including a light box having a color chart according to an embodiment of the present invention.

FIG. 1 is a block diagram of an imaging system and an image adjustment system including a light box having a color chart in an embodiment of the present invention. The imaging system herein will be described by exemplifying an electronic camera.

In FIG. 1, there are shown a light box 100 for adjusting white balance and color balance using a three-color color chart, a lens 101, a diaphragm 102 for adjusting light exposure, an imaging element 103, an analog front end 104 for A/D conversion by sampling the output of the imaging element 103, a signal processor 105, an image signal output unit 106, a white-balance adjustment unit 107 included in the signal processor 105, a color-balance adjustment unit 108 included in the signal processor 105, a photometric unit 109, an exposure control unit 110, a diaphragm drive unit 111, a photometric region A 112 for providing a region where the photometric measurement is performed with the photometric unit 109, a photometric region B 113 for providing a region where the photometric measurement is performed with the photometric unit 109, a color-adjustment control unit 114 for controlling a color-adjustment process, a mode switching unit 115 for switching the mode between an imaging mode and an adjustment mode, and a photometric region selecting unit 116 for selecting a photometric region (photometric region A or B) for the photometry with the photometric unit 109 in accordance with the mode switched by the mode switching unit 115.

In the imaging mode, a signal is processed as follows: a light ray incident from the lens 101 is photo-electrically converted by the imaging element 103 after receiving appropriate exposure adjustment with the diaphragm 102. The image signal photo-electrically converted in the imaging element 103 is then sampled and A/D converted in the analog front end 104 so as to produce an output from the image output unit 106 after receiving predetermined signal processing in the signal processor 105. The mode switching unit 115 is then used to select the imaging mode, and the sampling region used for the photometry in the photometric unit 109 is selected from the photometric region A by the photometric region selecting unit 116.

In the photometric unit 109, the A/D converted image signal is sampled over a region defined by the photometric region A 112 so as to control an exposure amount in the exposure control unit 110 and the light amount allowed by the diaphragm 102 under control of the diaphragm drive unit 111. In general, for photometry over the photometric region A 112, center-weighted average photometry is used so that the center of an object and its vicinity is considered during photometry. In the imaging mode, the white-balance adjustment unit 107 and the color-balance adjustment unit 108 have been pre-adjusted and process a color signal based on the pre-adjustment so that an optimal color signal is produced.

Figure 2:
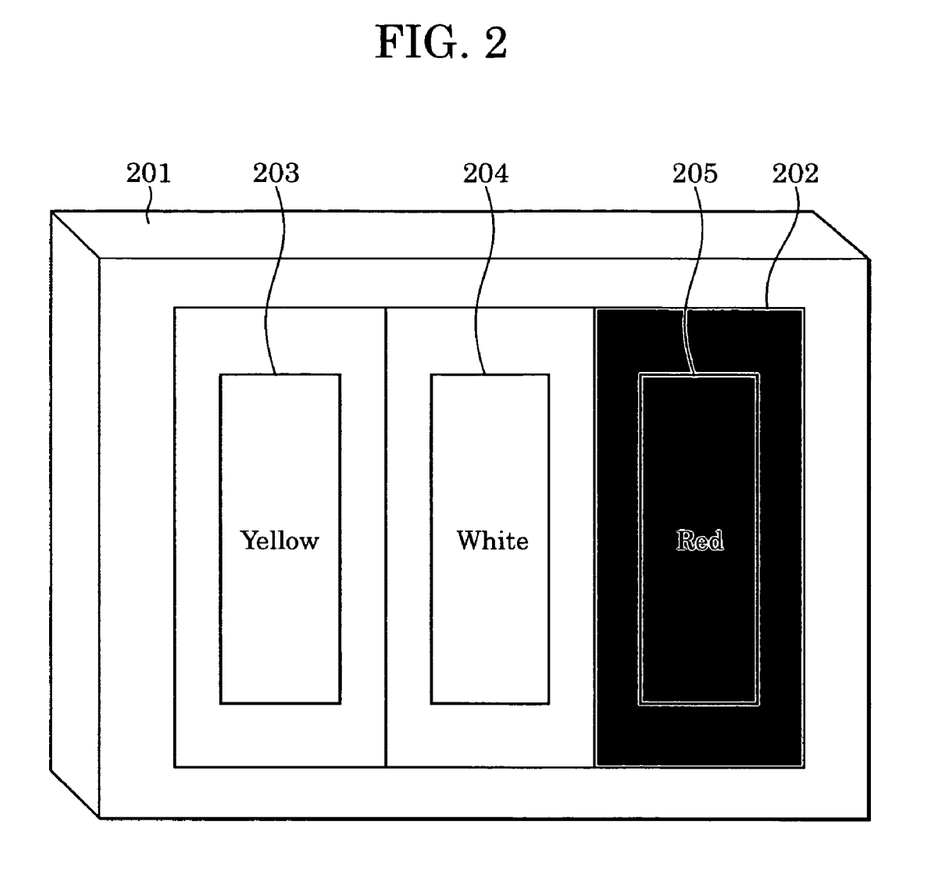
FIG. 2 is a schematic drawing of the color chart according to a first embodiment of the present invention.

One advantage of the present invention is that the color chart used for color balance adjustment is composed of three colors. FIG. 2 is a schematic drawing of the color chart according to the first embodiment of the present invention. This color chart is used for color adjusting in the imaging system.

In FIG. 2, there are shown a light box 201 used as a reference light source for white balance adjustment, a color chart 202 composed of three colors of yellow, white, and red, a sampling region 203 for sampling a yellow portion of the color chart, a sampling region 204 for sampling a white portion of the color chart, and a sampling region 205 for sampling a red portion of the color chart.

Figure 3:
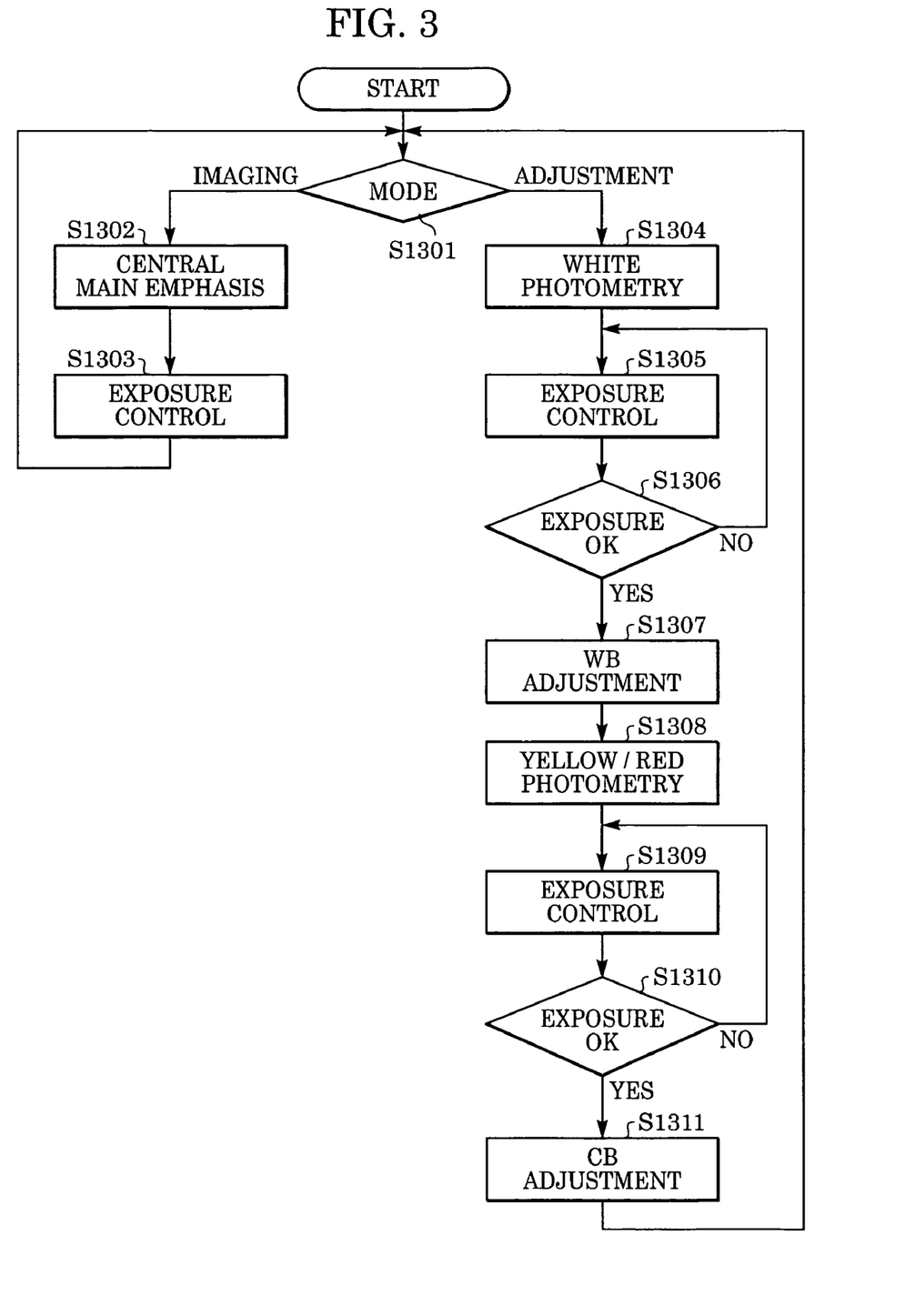
FIG. 3 is a flowchart of the processing in the image-pickup system according to the first embodiment.
Figure 4:
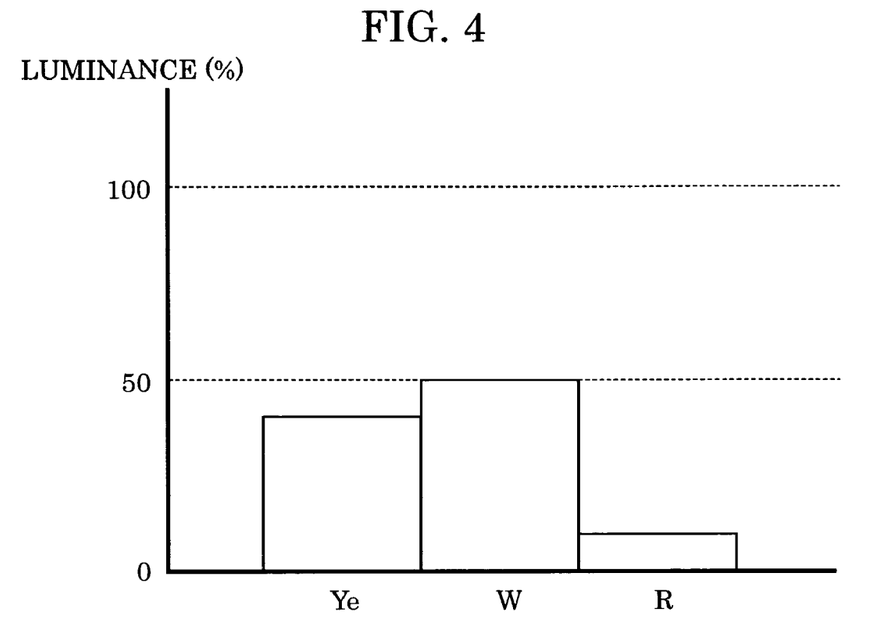
FIG. 4 is a characteristic drawing showing luminance levels during white balance adjustment by imaging three-color color chart.
Figure 5:
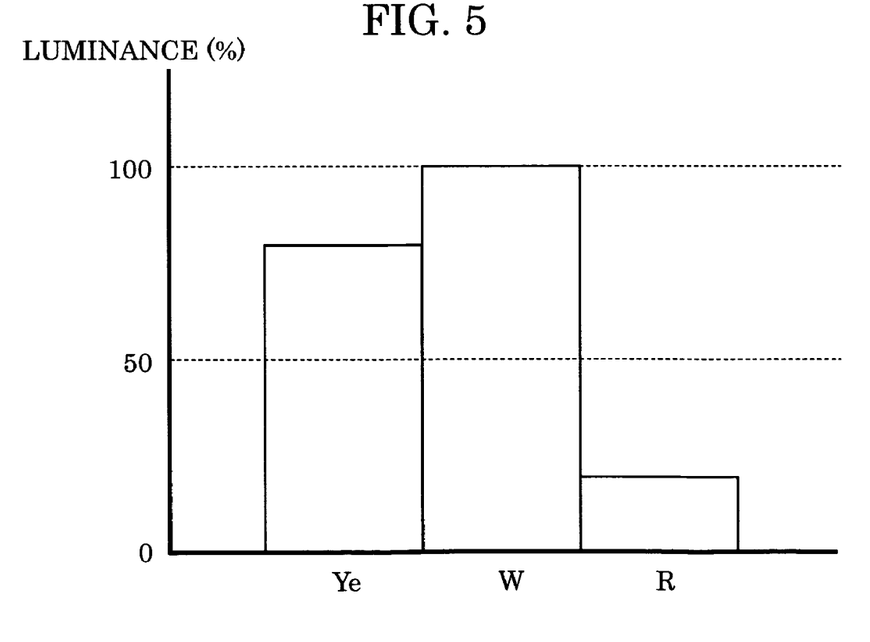
FIG. 5 is a characteristic drawing showing luminance levels during color balance adjustment by imaging the three-color color chart.

FIG. 3 is a flowchart showing a process in the imaging system according to the embodiment of the present invention; FIG. 4 is a characteristic diagram showing luminance levels during white balance adjusting obtained by imaging the three-color color chart; and FIG. 5 is a characteristic diagram showing luminance levels during color balance adjusting obtained by imaging the three-color color chart.

Signal processing in the imaging system of FIG. 1 will now be described with reference to the flowchart of FIG. 3. In FIG. 3, Step S1301, the mode of the imaging system is determined, that is, it is determined whether the imaging mode or the adjustment mode has been selected (using mode switching unit 115). In Step S1302, the imaging mode is selected. In this mode, the photometric unit 109 performs center-weighted average photometry over the photometric region A 112 selected by the selecting unit 116. Next, in Step S1303, image exposure is controlled by the exposure control unit 110.

On the other hand, in Step S1301, if the adjustment mode has been selected, color and white balance adjustment is then performed. This process will now be described.

First, white balance adjustment is performed.

The color chart 100 shown in FIG. 1 is imaged, and the light ray incident on the lens 101 is photo-electrically converted by the imaging element 103 after receiving appropriate exposure adjustment with the diaphragm 102 and is sampled and A/D converted in the analog front end 104. The mode switching unit 115 is then used to select the color adjusting mode, and the sampling region used for photometry in the photometric unit 109 is selected from the photometric region B 113 by the photometric region selecting unit 116. This photometric region B 113 includes one or more divisions of the entire image, and is equivalent to color chart regions 203 to 205 shown in FIG. 2. The region 204 is used for the white balance adjustment.

In the photometric unit 109, the A/D converted image signal is first sampled over a white region 204 defined by the photometric region B 113 so as to perform partial photometry (white photometry) (Step S1304). Based on the photometric result, an exposure amount is controlled in the exposure control unit 110 (Step S1305) and the opening of the diaphragm 102 is controlled by the diaphragm drive unit 111 (Step S1306). The luminance level herein of the exposure-controlled image signal becomes 50% for the central white portion as shown in FIG. 4, so that the image signal of the color chart controlled at 50% is entered into the signal processor 105.

Subsequently, the color adjustment mode is selected by the mode switching unit 115 so that the white balance is adjusted in the white-balance adjustment unit 107 by the color-adjustment control unit 114 (Step S1307). The color signal of a white portion of the color chart is then sampled. This uses a region identical to the region 204 used for the photometry. The white balance adjustment herein means the production of information, such as the control range for the white balance control, by sampling a reference image of a color temperature (white balance control attempts to control according to variation in environmental and lighting conditions when an object is imaged, by selecting a color temperature range corresponding to various lighting conditions). Here, the adjusted control range to be used for the white balance control is obtained by sampling reference images of color temperatures. The light box 201 for use in the color adjustment is at a color temperature of 5600K, and the white balance adjustment uses the reference color temperature 5600K and a color temperature converted into 3200K by attaching an amber filter. The control range of the white balance and the color determination of a white portion of an object are controlled using these two temperatures as the references.

Next, color balance is adjusted.

While the color chart 100 of FIG. 1 is imaged as is, the sampling region used for the photometry in the photometric unit 109 is selected from the photometric region B 113 by the photometric region selecting unit 116. The regions 203 and 205 are used for the color balance adjustment.

First, in the photometric unit 109, for the A/D converted image signal, the designated yellow region 203 and the red region 205 of the photometric region B 113 are averaged and sampled to perform partial photometry (yellow/red photometry) (Step S1308). Based on the photometric result, an exposure amount is controlled in the exposure control unit 110 (Step S1309) and the state (opening) of the diaphragm 102 is controlled by the diaphragm drive unit 111 (Step S1310). The luminance level herein of the exposure-controlled image signal becomes 50% on average for yellow and red portions as shown in FIG. 5, after which the image signal is entered to the signal processor 105.

An advantage of the present invention over conventional systems is that field angle can be aligned during chart imaging. This is because in center-weighted average photometry (in the photometric region A, for example) for conventional color adjustment of the entire image, if the peripheral region of the chart is reflected or the sides of the chart are cut off, the average luminance level is changed and an appropriate amount of exposure cannot be obtained. On the other hand, in the partial photometry (in the photometric region B, for example) according to the embodiment of the present invention, conditions cannot change as long as a different color is not entered into the photometric region or the photometric region does not extend beyond the region for photometry of the central portion of each color in a partial region of the image. That is, the photometric region in the adjustment mode can be provided independently of the photometric region in the imaging mode, so that the influence of transfer of the other region due to dispersion in field angle is prevented, thus achieving improvement in image adjustment accuracy. This is the same for white balance adjustment, so that the field angle can be more aligned than in conventional systems.

Subsequently, the color adjustment mode is selected by the mode switching unit 115, so that the color balance is adjusted in the color-balance adjustment unit 108 by the control of the color-adjustment control unit 114 (Step S1311). The color signals of the yellow portion and the red portion of the color chart are then sampled. Regions identical to the regions 204 and 205 used for the photometry are employed. The color balance herein means the adjustment of color tone and chroma of yellow and red in the chart in the same way as in the conventional example. The embodiment also provides desirable target values to properly reproduce the color of the human flesh (also a memory color). Since yellow and red do impact the color of the human flesh, they are adjusted to determine a matrix factor so that both the colors have desired target values. The exposure control unit 110 herein includes exposure control target values different for each measuring region. According to the embodiment, for adjustment of the color balance, a linear matrix factor and a gain are calculated with respect to color-difference signals Cr and Cb.

[Numerical Formula 1]

$$Cr_{(output)} = l1 \times (Cr_{(input)} + k1 \times Cb_{(input)}) \quad \text{(Equation 1)}$$

$$Cb_{(output)} = l2 \times (Cb_{(input)} + k2 \times Cr_{(input)}) \quad \text{(Equation 2)}$$

where, $Cr_{(output)}$, $Cb_{(output)}$: target value of adjustment l1, l2: gain factor $Cr_{(input)}$, $Cb_{(input)}$: sampled color-difference signal k1, k2: linear matrix factor By respectively substituting yellow and red target values and sampled values into Equation 1 and Equation 2, the gain factors (11 and 12) and the linear matrix factors (k1 and k2) are obtained so as to have color-balance adjusted results.

Figure 6:
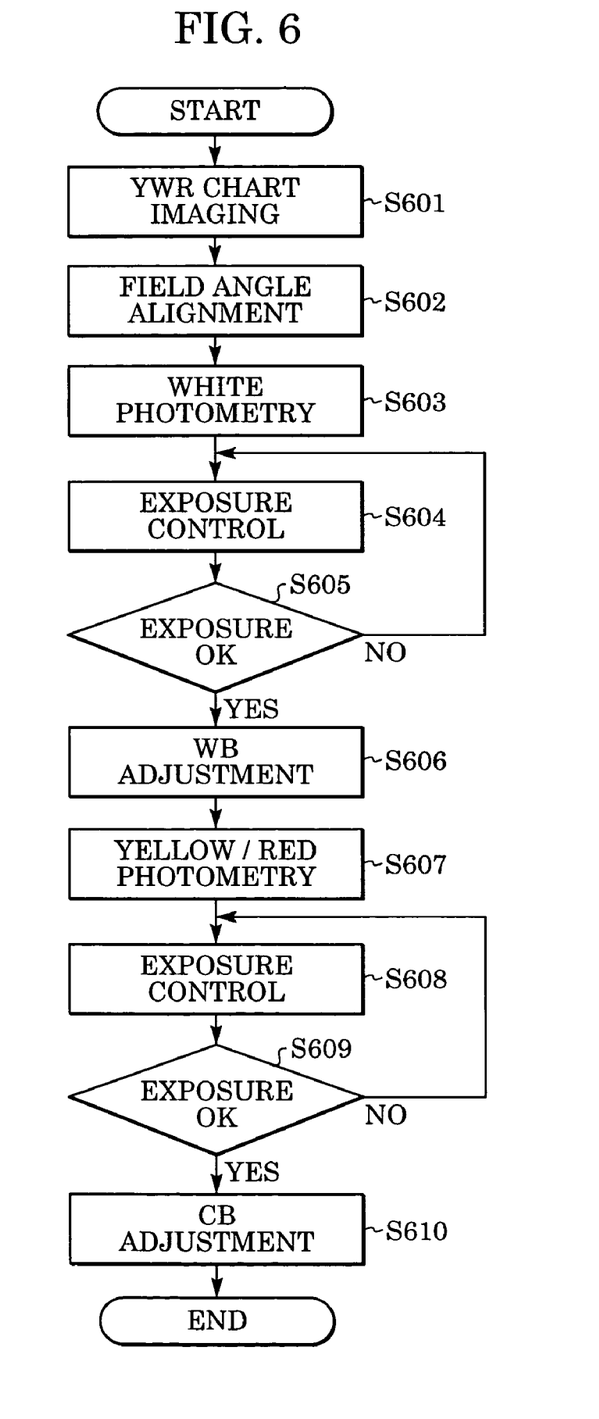
FIG. 6 is a flowchart of the color adjustment process in the image-pickup system according to the embodiment.

FIG. 6 is a flowchart showing a color adjustment process of the imaging system according to the embodiment of the present invention. FIG. 6 shows the process in the color-adjustment mode of FIG. 3 relative to FIG. 11, which is a flowchart of the color adjustment process in a conventional image-pickup system. Steps S1304-S1307 of FIG. 3 and steps S603-S606 of FIG. 6 are equivalent and Steps S1308-S1311 of FIG. 3 and Steps S607-S610 of FIG. 6 are also equivalent.

When FIG. 6 and FIG. 11 are compared, Steps S1107-S1109 of FIG. 11 (culled out by broken lines) can be omitted from the process of FIG. 6. Not only can the chart replacement and field angle alignment steps be omitted, advantageously, the color-bar chart imaging step can be omitted as well. The chart replacement mechanism can be omitted in view of the automatic adjustment provided. This results in cost savings for adjustment equipment and space savings for adjustment tools. Since there is a room for the field angle alignment during the chart imaging as mentioned above, this has the advantage of the simplification of the field angle alignment mechanism.

According to the present embodiment, the three partial photometric regions B 203 to 205 are provided; alternatively, one region may be provided at the center so as to prevent exposure due to dispersion in field angle and multiple adjustments during imaging, although it may be difficult to automate adjustment and reduce the number of steps.

The color chart according to the present embodiment is indeed an example so that the chart need not be composed of yellow, white, and red, and the photometric region may not be identical to the colorimetry region. Also, the diaphragm 102 for controlling exposure is an example; other methods for accomplishing control can be used. For example, control can be implemented by using storage time or an electrical gain. The white balance adjustment and the color balance adjustment after the colorimetry may be carried out with different methods.

Second Embodiment

Figure 7:
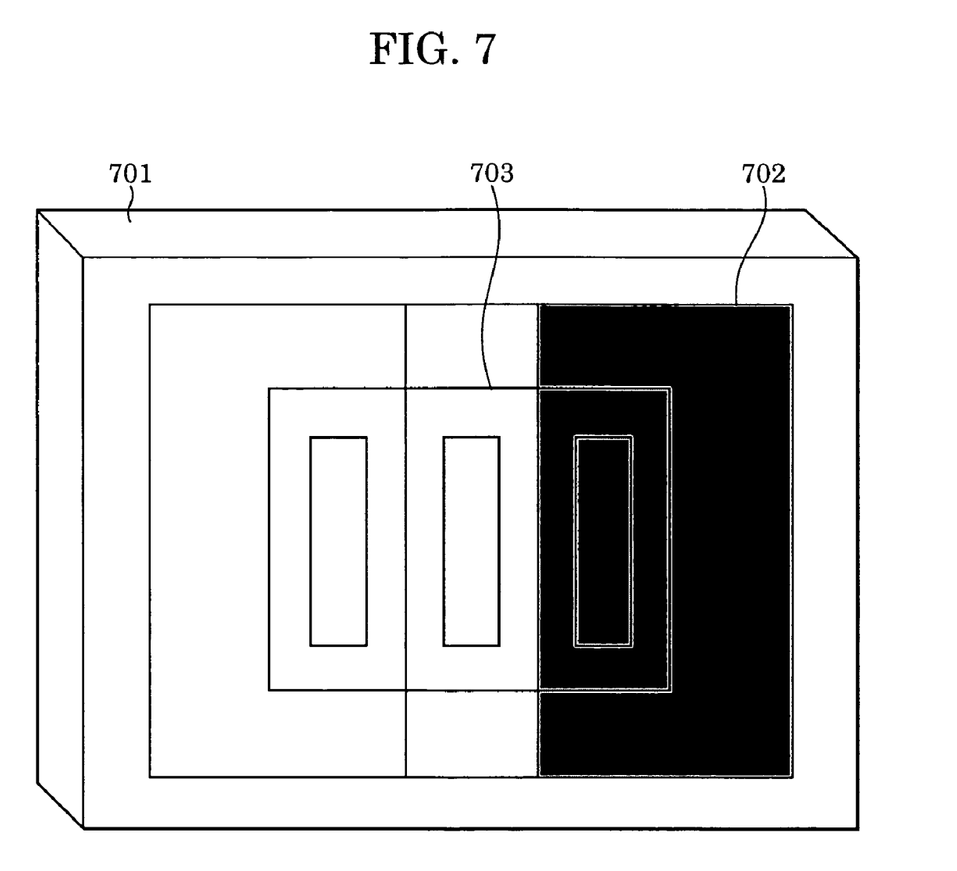
FIG. 7 is a schematic drawing of a color chart according to a second embodiment of the present invention.

FIG. 7 is a schematic drawing of a color chart according to the first embodiment of the present invention.

In FIG. 7, there are shown a light box 701 with a reference color temperature for white balance, a color chart 702 composed of yellow, white, and red, and a region 703 showing a field angle imaging the chart and a sampling range during adjustment in the image-pickup system.

According to the present invention, the central portion of each color is photometrically observed with partial photometry, so that conditions cannot change as long as a different color is not entered into the photometric region or the photometric region does not extend beyond the chart. Note that there is more room for field angle alignment of the chart compared to that in the conventional example. In order to further increase the room for the field angle alignment, according to the embodiment, the white balance and the color balance are adjusted using the color chart 702 shown in FIG. 7.

The color chart 702 has a white portion arranged in the center and yellow and red portions with areas larger than that of the white portion. During the color adjustment in the image-pickup system, the color chart 702 is imaged at a field angle shown by the region 703 while the adjustment itself is operated in a similar manner as in the first embodiment.

Advantages in using the color chart 702 are that the color chart 702 cannot turn aside the sampling region because the color chart 702 is larger than the imaging region in size even when the field angle is displaced aside the imaging region; and the field angle can be easily aligned at the center of the color chart 702, so that by arranging the white portion in the center, the black portion of the peripheral frame can be prevented from being reflected, which is produced by the white portion arranged at the edge of the field angle. That is, according to the embodiment, the white balance can be obtained without being affected by the displacement of the field angle. Also, even if there is provided a color other than black in the vertical direction or in the horizontal direction without arranging the white portion at the center, the effect on the white balance is reduced, thus reducing inaccuracy in white balance correction. Since the light-source color temperature may be reduced in accuracy when the light box approaches the periphery from the center, the accuracy is improved if the white portion, which is liable to affect the color temperature, is arranged at the center.

According to the second embodiment, there is more room for the field angle alignment during the chart imaging more than in the first embodiment, the field angle alignment itself may also be eliminated. The color chart according to the embodiment is indeed an example so that the chart need not be composed of yellow, white, and red; and the photometric region need not be identical to the colorimetry region.

Third Embodiment

Figure 8:
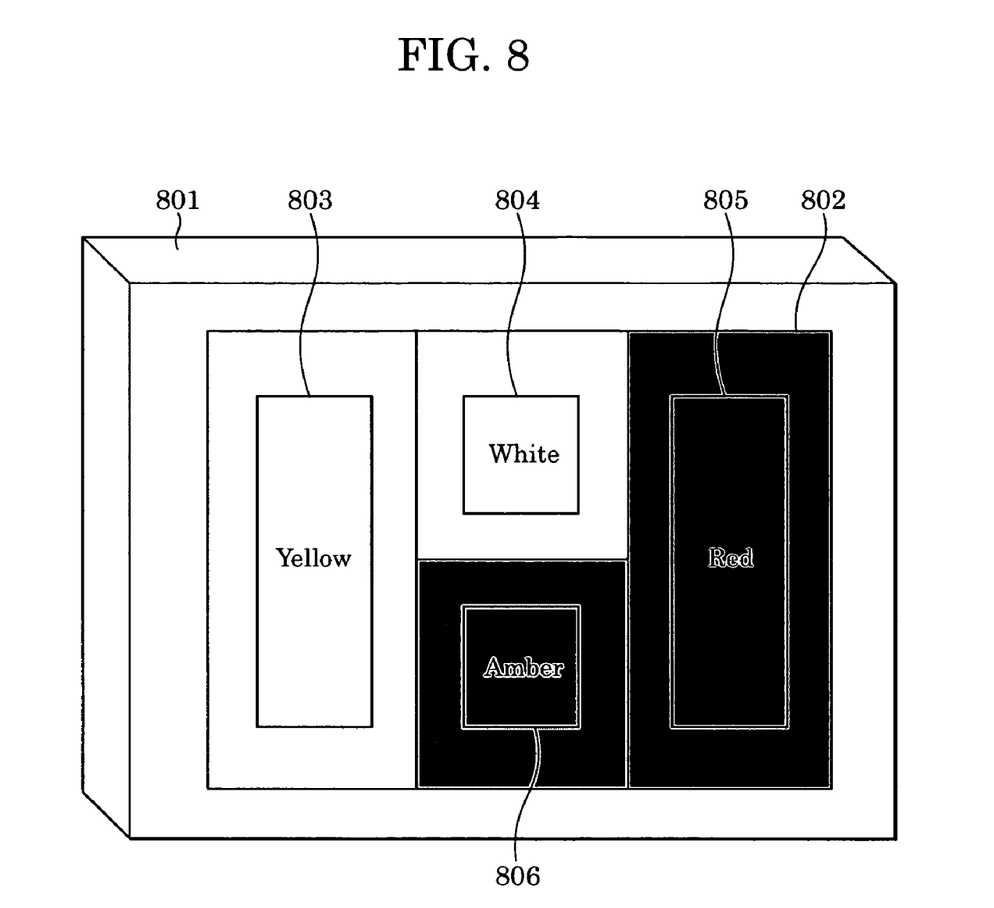
FIG. 8 is a schematic drawing of a color chart according to a third embodiment of the present invention.

FIG. 8 is a schematic drawing of a color chart according to a third embodiment of the present invention.

In FIG. 8, there are shown a light box 801 with a reference color temperature of white balance, a color chart 802 composed of yellow, white, and red, a region 803 showing a yellow sampling range during color balance adjustment, a region 804 showing a white sampling range during white balance adjustment, a region 805 showing a red sampling range during color balance adjustment, and a region 806 showing a sampling range of a color-temperature conversion color during white balance adjustment.

The difference between the third embodiment and the first embodiment is that the color chart is provided with a color-temperature conversion color in the third embodiment. As described in the first embodiment, the light box 801 used for the adjustment has a color temperature of 5600K. For the white balance adjustment, the 5600K reference-color temperature and a color temperature converted to 3200K by putting an umber filter thereon are used so as to control the control range of the white balance and the color determination for determining a white portion of an object using these two temperatures as references. That is, for the white balance adjustment, the umber color-temperature conversion filter is provided in addition to the light box at a color temperature of 5600K. The color-temperature conversion filter has a color-temperature conversion factor of 12 da mired (micro-reciprocal degrees) so as to convert 5600K into 3200K.

The color chart 802 shown in FIG. 8 is provided with a color-temperature conversion portion by incorporating a color filter having a color-temperature conversion property equivalent to that of this color-temperature conversion into part of a white (achromatic color other than black) portion of the color chart 802. According to the embodiment, this color-temperature conversion portion serves as the color-temperature conversion filter, eliminating separately having a color-temperature conversion filter.

Upon starting color adjustment, white balance adjustment is initially performed.

Specifically, the color chart 802 shown in FIG. 8 is imaged and the region 804 is sampled so as to make the partial photometry, and on the basis of the photometric result, the exposure is controlled. After completion of the exposure control, the white balance is adjusted at a color temperature of 5600K. The color signal of a white portion of the color chart is sampled. This uses a region identical to the region 804 used for the photometry. Subsequently, the region 806 is sampled so as to make the partial photometry in the same way, and on the basis of the photometric result, the exposure is controlled. After completion of the exposure control, the white balance is adjusted at a color temperature of 3200K. Then, the color signal of an umber portion (color-temperature conversion color) of the chart is sampled. This uses a region identical to the region 806 used for the photometry.

As described in the first embodiment, the white balance refers to sampling reference images at two color temperatures so as to obtain a control range of the white balance and the color determination for determining a white portion of an object using these two temperatures as references.

Figure 9:
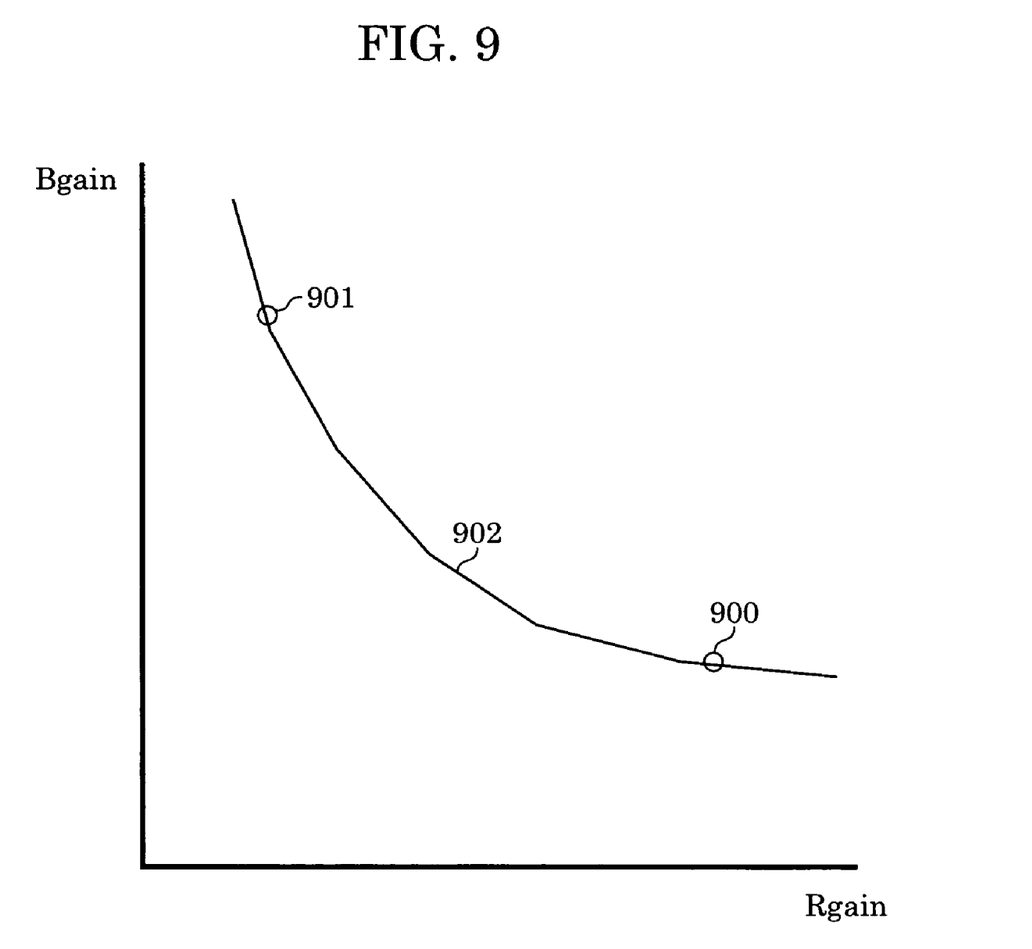
FIG. 9 is a drawing showing control characteristics during white balance control.

FIG. 9 is a drawing showing the gain for R and B for white balance control for different color temperatures.

In FIG. 9, there are shown a reference point 900 of the gain of R and B signals when the white balance is fitted to the reference color temperature of 5600K, a reference point 901 of the gain of R and B signals when the white balance is fitted to the reference color temperature of 3200K, and a white balance control characteristic 902 fitted to color temperature changes using the reference point 900 and the reference point 901 as references. In the white balance adjustment, the white balance control characteristic 902 is determined by determining the reference points 900 and 901, so that in the imaging mode, the white balance is controlled on the basis of the control characteristic 902. The color balance is adjusted thereafter in the same way as in the first embodiment.

According to the embodiment, since the color chart includes the color-temperature conversion filter, it is not necessary to separately prepare a filter, and a mechanism for automatically inserting a filter can be eliminated during the adjustment.

The color chart according to the embodiment is indeed an example so that the chart need not be composed of white, umber (color-temperature conversion color), and red. The color chart may be a combination of blue, green, etc. The photometric region need not be identical to the colorimetry region. Other techniques may also be employed for white balance adjustment after the colorimetry.

According to the embodiments (first to third embodiments), the white balance is used for white color; however, it may also be gray or an achromatic color other than black capable.

Other Embodiment

The present invention can also be achieved by providing a storage medium storing program codes for performing the aforesaid processes to an image sensing system or device, reading the program codes, by a CPU or MPU of the image sensing system or device, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and RAM, and computer network, such as LAN (local area network) and WAN (wide area network), can be used for providing the program codes.

Furthermore, aforesaid functions according to the above embodiments are realized by executing the program codes which are read by a CPU of the image sensing system or device, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or device or in a memory provided in a function expansion unit which is connected to the image sensing system or device, CPU or the like contained in the function expansion card or unit performs part or entire process in accordance with designations of the program codes and realizes functions of the above embodiments.

In a case where the present invention is applied to the aforesaid storage medium, the storage medium stores program codes corresponding to the flowchart of FIG. 3 or 7, described in the embodiments.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-pickup system for producing images by imaging an object, the system comprising:
    a mode switching unit that switches a mode at least between an imaging mode that captures an image of an object and an adjustment mode;
    an input unit which inputs images of a color chart composed of at least three colors including an achromatic color and a chromatic color by imaging a single object;
    a color adjustment unit which sequentially executes both a white balance adjustment by color-measuring an achromatic color portion of the color chart on the single object and a color balance adjustment by color-measuring a chromatic color portion of the color chart on the single object in a case that the mode is switched to the adjustment mode by the mode switching unit;
    a photometric region selecting unit that selects automatically, in the adjustment mode, a partial photometric region corresponding to each of the colors of the color chart, and selects, in the imaging mode, a partial photometric region that is different from the partial photometric region selected in the adjustment mode; and
    an exposure control unit which, in the adjustment mode, controls exposure of light incident from the object using photometric information obtained by making photometric measurement in an image signal included in the images on a partial photometric region corresponding to each of the colors selected by the photometric region selecting unit.

2. The system according to claim 1, wherein the color chart includes red and yellow as chromatic colors.

3. The system according to claim 1, wherein during color adjustment, the exposure control unit controls exposure of the incident light using the photometric information obtained by making photometric measurement on a colorimetry region of the color chart used for the color adjustment including the white balance adjustment or the color balance adjustment.

4. The system according to claim 3, wherein the colorimetry region is identical to the photometric region.

5. The system according to claim 1, wherein the color chart is provided with a color-temperature conversion color by incorporating a color-temperature conversion filter into achromatic colors other than white and black as the achromatic color portion.

6. The system according to claim 1, wherein the two chromatic colors are laterally arranged about the achromatic color as the center.

7. The system according to claim 6, wherein the chromatic colors are yellow and red with areas larger than that of the achromatic color.

8. The system of claim 7 wherein the color chart further comprises a color-temperature conversion color.

9. The system of claim 6 wherein the color chart further comprises a color-temperature conversion color.

10. The system of claim 9 wherein the color-temperature conversion color indicates a sampling range of the color-temperature conversion color during white balance adjustment.

11. The system according to claim 1, wherein the photometry using the photometric region in the imaging mode is center-weighted average photometry.

12. An image adjusting method for adjusting an image produced by imaging an object, the method comprising:
    switching a mode at least between an imaging mode that captures an image of an object and an adjustment mode that executes both white balance adjustment and color balance adjustment;
    inputting images of a color chart composed of at least three colors including an achromatic color and a chromatic color by imaging a single object;
    sequentially executing both a white balance adjustment by measuring an achromatic color portion of the color chart on the single object and a color balance adjustment by color-measuring a chromatic color portion of the color chart on the single object in a case that the mode is switched to the adjustment mode by a mode switching unit;
    selecting automatically, using a photometric region selecting unit, in the adjustment mode, a partial photometric region corresponding to each of the colors of the color chart, and selecting, in the imaging mode, a partial photometric region that is different from the partial photometric region selected in the adjustment mode; and
    controlling exposure, in the adjustment mode, of light incident from the object using photometric information obtained by making photometric measurement in an image signal included in the images on a partial photometric region corresponding to each of the colors selected by the photometric region selecting unit.

* * * * *